United States Patent Office 2,805,988
Patented Sept. 10, 1957

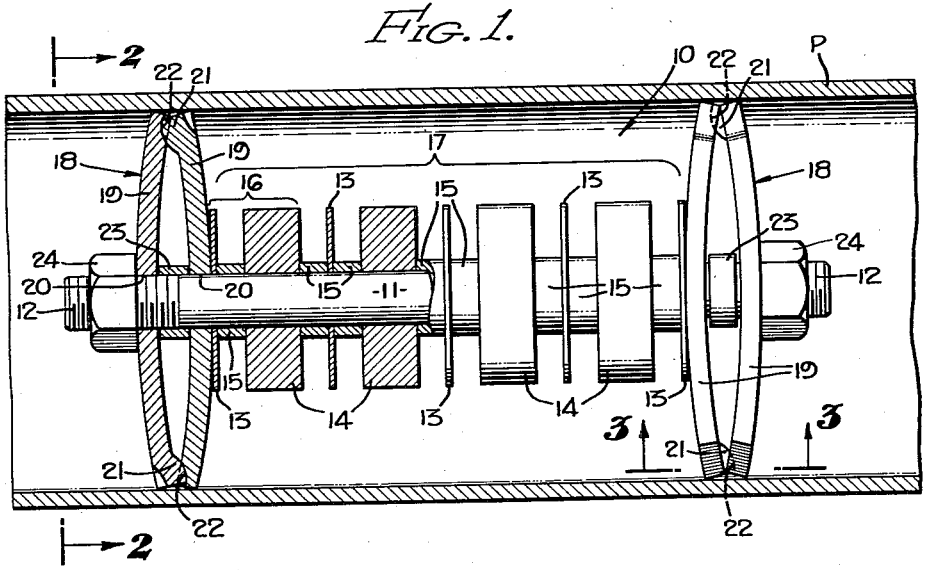
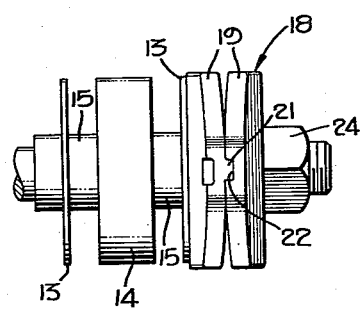
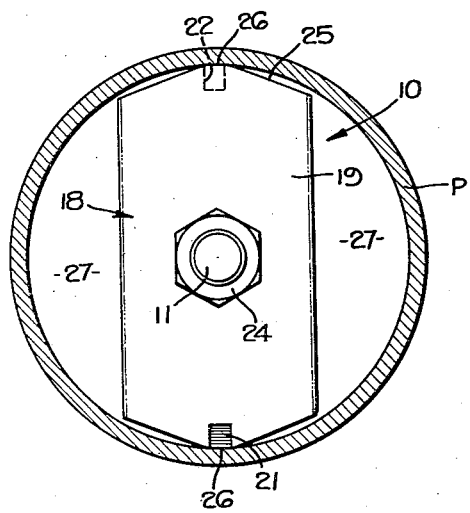

2,805,988

ELECTROLYTIC LIQUID TREATING DEVICE

Clarence M. Rader, Monterey Park, Calif.

Application January 11, 1954, Serial No. 403,283

3 Claims. (Cl. 204—248)

This invention relates to a device for treating liquid electrolytically and is especially adapted for such use where the liquid to be treated flows along a horizontal pipe.

The salts and minerals present in water introduced into heaters and boilers has a tendency to form deposits on the inner faces of the metal walls thereof in what is known as scale. If no opposing force is set up this scale continues to be deposited and insulates the water from the metal wall of the heater or boiler to the point where there is a very low transfer of heat from the metal wall to the water so that destructive temperatures are set up in the wall causing this to burn out after a relatively short life.

The practice has long been followed to set up a counter force in the form of an electrolytic action in the water in such a heater or boiler which will prevent the formation of scale and the damage caused thereby.

This electrolytic action is effected by a battery comprising a series of galvanic cells, which are formed by connecting copper and zinc electrodes, and submerging this battery in the water in said heater or boiler. This battery sets up an electrolytic force which renders the salts and minerals suspended in the water inert and also has the beneficial effect of causing any scale which has previously deposited on the inner surface of the heater or boiler in question to be dissolved in the water, leaving the metal surface clean.

The effectiveness of the electrolytic device above described varies in proportion to the degree with which good electric contact is maintained between the electrodes of the individual cells as well as the electric contact maintained between adjacent cells. It is also important to suspend the battery of the device with the electrodes thereof as uniformly spaced as conveniently possible from the metal walls of the heater or boiler confining the water in which the device is submerged. Where the device must be located in a relatively short pipe of large diameter the suspension of the device in this manner presents a problem.

It is an object of the present invention to provide an electrolytic liquid treating device having a novel means for maintaining the electrodes of the battery in tight electrical contact over a long period of operation despite substantial erosion to which the electrodes are subjected, said means at the same time providing a mounting for said battery concentrically locating the latter within a large diameter pipe.

Another object of the invention is to provide an electrolytic device having a spring tension means by which the device may be subjected to fresh tension as the erosion of the electrodes proceeds to the point where the net length of the battery is substantially decreased.

A still further object of the invention is to provide a simple and inexpensive spring mechanism, adapted to be employed in an electrolytic liquid treating device as aforesaid, which is inexpensive to manufacture and occupies a relatively small space on the axis of the device.

The manner of accomplishing the foregoing objects as well as further objects and advantages will be made manifest in the following description taken in connection with the accompanying drawings.

Fig. 1 is a cross-sectional view of a horizontally disposed pipe which contains a preferred embodiment of the present invention, portions of the latter being broken away to show construction details thereof.

Fig. 2 is a cross-sectional view taken on the line 2—2 of Fig. 1.

Fig. 3 is a fragmentary view of an end portion of the device shown in Fig. 1, said view being taken on the line 3—3 of Fig. 1.

Referring specifically to the drawings, the preferred embodiment of the invention illustrated therein comprises an electrolytic water treating device 10 having an axial mounting rod 11 provided with threads 12 at its opposite ends and having assembled on said rod a series of annular copper electrodes 13, zinc electrodes 14 and spacers 15 which separate said electrodes. Each adjacent pair of electrodes 13 and 14 and the collar 15 separating the same comprises a galvanic cell 16 and the series of these cells assembled on the rod 11 comprise a galvanic battery 17.

Provided at opposite ends of the rod 12 are two leaf spring means 18 each of which includes a pair of leaf springs 19 which are identical in structure and have central holes 20. The springs 19 are semi-elliptic in shape and are provided with matched tongues 21 and notches 22 at their opposite ends which interlock when said springs are placed together with their concave faces turned towards each other. The leaf springs 19 are thus assembled at opposite ends of the battery 17 with the rod 12 penetrating the holes 20 as well as spacer collars 23 one of which lies between the leaf springs 19 of each spring means 18.

When the two spring means 18 are thus assembled on opposite ends of rod 12 as shown in Fig. 1, nuts 24 are screwed onto the threads 12 to compress the battery 17 between the two spring means 18. A substantial yieldable pressure is thus applied to the battery 17 by tightening up the nuts 24 to the point where leaf springs 19 are flattened out to a degree where central portions of said springs engage opposite ends of the spacing collars 23.

The device 10 is shown as installed in a horizontal water pipe P which is relatively short and of large diameter. The leaf springs 19 are shaped at their opposite ends as indicated in Fig. 2 to form blunt points 26 which fit snugly into the pipe P on a diameter of the latter thereby positioning the battery 17 substantially concentric with the pipe P.

As clearly shown on Fig. 2 the leaf springs 19 are of a restricted width so as to allow ample spaces 27 at opposite sides of each spring means 18 through which water can flow along the pipe P past the device 10. The leaf spring means 18 thus serve the dual function of mounting the device 10 in the pipe P and of maintaining the battery 17 under a relatively high degree of yieldable compression so that good electric contact is maintained between the electrodes of said battery for a relatively long period without attention to the same being necessary.

The invention also has the advantage of providing gauging means in the form of the spacer collars 23 in each of the spring means 18 which limit the amount of deformation which can be imparted to the leaf springs 19 by tightening the nuts 24. Damage to the springs and to the elements of the battery 17 is thus prevented and an indication given to the person assembling the device 10 when the proper degree of pressure has been applied to the spring means 18 by tightening on the nuts 24.

Another feature of importance in the present invention is the opportunity provided when the spring means 18 has become relaxed on account of the erosion of the electrodes of the battery 17 to restore the original yieldable compressive forces with which the battery is compressed between the two spring means 18, by again tightening on the nuts 24 until the collars 23 halt further tightening of the nuts 24.

The claims are:

1. An electrolytic liquid treating device comprising: an axial rod; a series of centrally perforated metallic elements assembled on said rod; a pair of arcuate leaf springs centrally apertured and assembled on said rod; and means provided on opposite ends of said rod and applicable to the aforesaid elements assembled on said rod to compress the same to resiliently deform said leaf springs and cause the latter to exert a substantial yieldable pressure against said elements, maintaining the latter in good electrical contact in spite of erosion of said elements incidental to electrolytic activity, the width of said leaf springs being substantially less than their length, said springs being arched towards each other to bring their opposite ends into corresponding engagement; and intermeshing deformations formed in said leaf springs for preventing relative rotation of one of the springs of said pair relative to the other spring of said pair.

2. A combination as in claim 1 in which two such pairs of springs are provided on said shaft in substantial axial spaced relation, the blank outline of said leaf springs being adapted to substantially fit the inner diameter of a pipe, in which said device is made to be installed, whereby said leaf springs act to suspend said device substantially concentrically within said pipe and yet allow liquid to flow freely along said pipe over said elements and around said springs.

3. A combination as in claim 1 in which a spacer surrounds said rod between said leaf springs to limit the distortion which may be transmitted to said leaf springs by said compression means.

References Cited in the file of this patent

UNITED STATES PATENTS

| 1,655,781 | Caraccio | Jan. 10, 1928 |
| 2,218,581 | Levan | Oct. 22, 1940 |
| 2,603,596 | Vangsnes | July 15, 1952 |

FOREIGN PATENTS

| 345,332 | Italy | Dec. 29, 1936 |